Oct. 7, 1969    T. J. RAMSEY    3,470,679
WORKBENCH WITH FILTERED LAMINAR FLOW OF CLEAN AIR
Filed Oct. 17, 1967    3 Sheets-Sheet 1

INVENTOR.
THOMAS J. RAMSEY
BY Howard J. Jeandron
AGENT

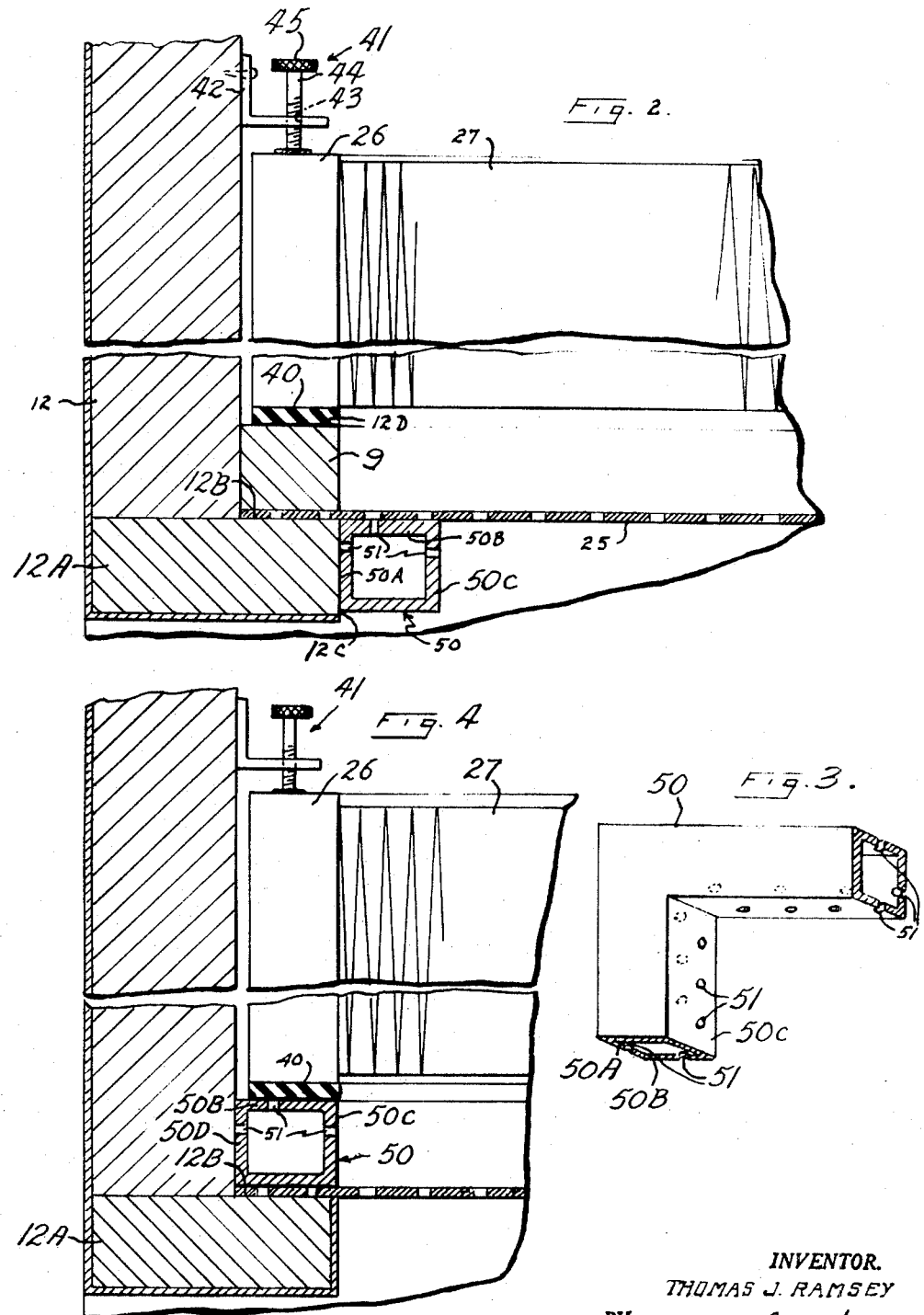

Oct. 7, 1969  T. J. RAMSEY  3,470,679
WORKBENCH WITH FILTERED LAMINAR FLOW OF CLEAN AIR
Filed Oct. 17, 1967  3 Sheets-Sheet 3
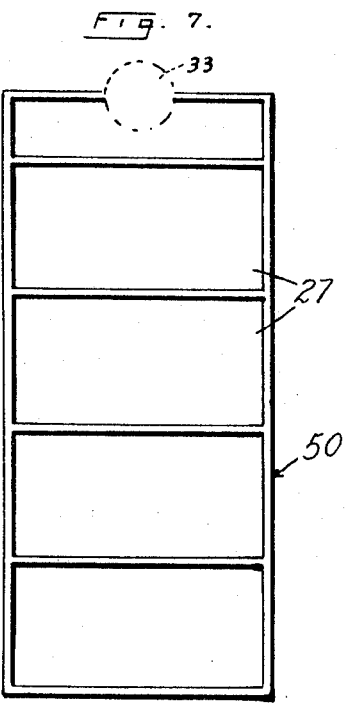
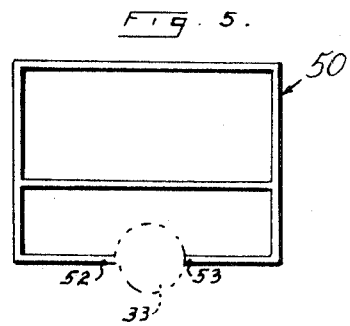
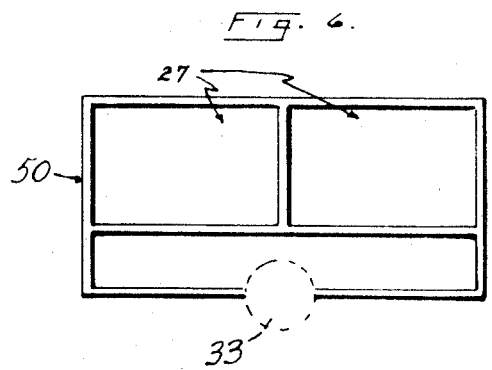
INVENTOR.
THOMAS J. RAMSEY
BY
AGENT United States Patent Office 3,470,679
Patented Oct. 7, 1969

3,470,679
WORKBENCH WITH FILTERED LAMINAR
FLOW OF CLEAN AIR
Thomas J. Ramsey, Neptune, N.J., assignor to Ramney Industries, Corporation, Farmingdale, N.J., a corporation of New Jersey
Filed Oct. 17, 1967, Ser. No. 675,831
Int. Cl. B01d 35/00
U.S. Cl. 55—473                3 Claims

ABSTRACT OF THE DISCLOSURE

A workbench enclosed on all sides except the front and provided with a filtered flow of clean air over said workbench in which the periphery of the filter is provided with a perforated tubular frame to absorb all contaminated leakage of air around the periphery of said filter to insure a clean filtered flow of air over the workbench at all times.

Figure 1:
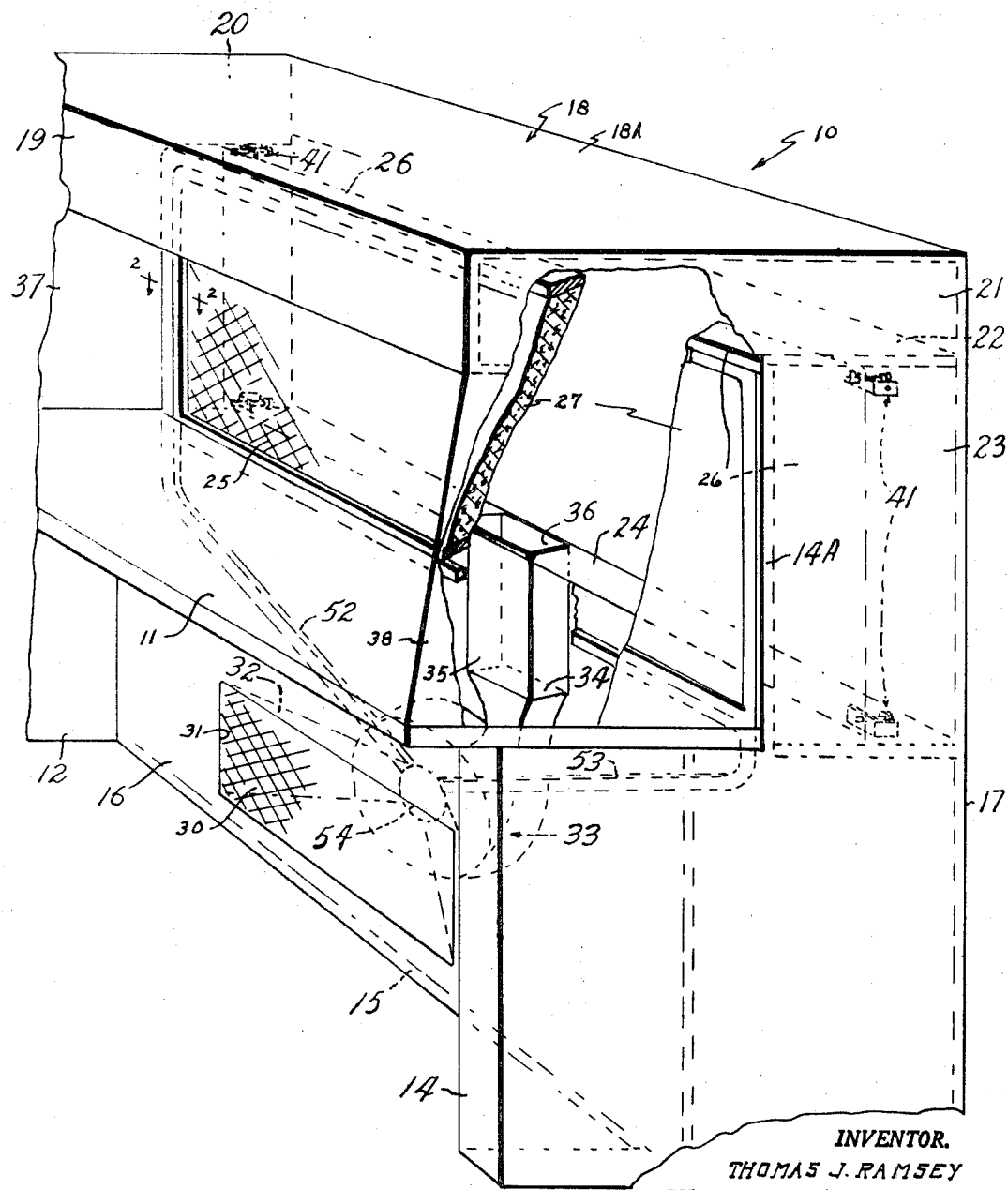

This invention is related to my prior Patent No. 3,284,148 for a blower contained vibration-free workbench.

This invention relates to a workbench wherein a filtered laminar flow of clean air is provided over the workbench and particularly the platform supporting the articles or elements being worked upon and means are included to absorb any source of contamination to be recirculated and filtered to provide an optimum of clean air.

Workbenches with a filtered laminar flow of air are well known but because of contamination that may be produced within the filter itself, such as from the glued edges or because of leakage around the edges of the filter due to improper installation of the filter, or a poor sealing at the joint between the frame of the workbench and the filter, or using faulty gasket material that may leak, or insufficient pressure or uneven pressure in the mounting to hold the filter pressed against the gasket frame, there may be contamination drawn into the clean air supplied to the workbench.

It is an object of this invention to absorb the contaminated air flow adjacent the periphery of the filter in a laminar air flow workbench in which there is a flow of air through the filter to remove contamination from the air and produce a clean air flow over the workbench.

It is a further object of this invention to absorb the contaminated air flow through or around the seal that is positioned about the periphery of the filter in a laminar air flow workbench in which there is a degree of leakage of air through the seal and around the seal and this air is recirculated by the blower to remove contamination from the air and produce a clean air flow over the workbench.

A further object is to remove the contamination found in the air that is supplied through a filter over a workbench by providing a plenum chamber which in turn provides an equal pressure of air over the entire face of a filter, said air in said plenum chamber being at a greater pressure than the air surrounding said workbench, and means to seal the periphery of said filter, and means to absorb any contaminated air flow adjacent the periphery of the filter as well as any leakage of air through the seal surrounding said filter and recirculate said absorbed air through said filter to provide an optimum of clean air.

Other objects of this invention shall be apparent by reference to the accompanying detailed description and the drawings in which FIG. 1 is a perspective illustration of the front of a workbench partially in cross section, FIG. 2 is a cross sectional view taken on line 2—2 of FIG. 1, FIG. 3 is a perspective illustration of a portion of the upper corner of the tubular frame, FIG. 4 is a cross sectional view similar to FIG. 2 showing a further embodiment, FIG. 5 is a front elevational view of the welded assembly of the tubular frame fitted to the periphery of a single filter as used in FIG. 1, FIG. 6 is a front elevational view of the welded assembly of the tubular frame fitted to the periphery of a double filter as used in a further embodiment, and FIG. 7 is a front elevational view of the welded assembly of the tubular frame fitted to the periphery of a plurality of filters as used in a still further embodiment.

Referring to FIG. 1 there is illustrated a workbench 10. The workbench is particularly designed to produce a flow of clean air over a work platform 11 so that all work performed on platform 11 may be assured of an uncontaminated flow of air at all times. The workbench 10 comprises a boxlike structure formed with two sides 12 and 14 which are also the supporting portions for the platform 11, the sides 12 and 14 being cut back in the platform area and extending upward behind the platform. The workbench includes a bottom 15 and a recessed panel 16 under platform 11 and a back 17 and top 18. The top 18 is formed in a boxlike form to provide useable space above the workbench 10. The top 18 includes a top panel 18A that abuts with back 17 and a front panel 19, two side panels 20 and 21 and a panel 22 to cover a chamber 23, chamber 23 abutting with the back 17 and provided with the extension of the side members 12 and 14 on either side and provided with an open grill 25 in front and a base 24. A filter frame 26 is positioned between sides 12 and 14 and between the top of platform 11 and the lower surface of top 18 to support a filter 27 in adjacent relationship with grill 25. Thus chamber 23 known as a plenum chamber is formed behind filter 27 and completely enclosed by the members described. The recessed panel 16 is provided with a grill 30, the grill being mounted in an aperture 31 in panel 16. On the interior side of aperture 31, a conelike enclosure 32 is provided abutting the grill 30 on its larger dimension and abutting a blower 33 at its smaller end. The blower 33 is operated by a motor (not shown). The blower 33 at its exhaust port 34 is connected by means of a conduit 35 to an aperture 36 in the base 24 of the plenum chamber 23. Thus in operation the blower 33 will draw air through grill 30, through the funnel shaped element 32 into the blower and blow the air through exhaust port 34 through the conduit 35 through the aperture 36 into the plenum chamber 23. The air will build up in a laminar form within chamber 23 and due to the increased pressure will be filtered through the filter 27 to flow out and over the work platform 11. The platform 11 may also include a pair of shields 37 and 38 on either side thereof to insure only the flow of clean air from the filter 25 out over platform 11 to be exhausted into the atmosphere. The chamber formed within the top 18 is utilized for wiring and lighting and any accessories connected with the use of this device. The configuration described with relation to FIG. 1 is by way of example as the configuration of workbenches may vary according to the preferred design for a particular use. With a workbench as described in FIG. 1, it is intended to provide an uncontaminated flow of air over platform 11 and in this particular device a special filter referred to as a HEPA (high efficiency particulate) air filter is utilized and the efficiency of this filter is 99.97% and it is efficient in filtering particles of 0.3 micron in size or larger of any kind. The filter media may be paper, ceramic, foam, etc. The filter frame may be wood, pressed board, plywood or metal. The filter media is glued to the filter frame around the periphery of the media.

Referring to FIG. 2 which is a cross-sectional view taken on line 2—2 of FIG. 1, it is to be noted that the filter 27 is mounted in the frame 26 and the filter fits adjacent the grill 25. However at the side, frame 12 along the entire height of grill 25 is provided with a panel 12A that extends beyond the thickness of side 12 so that a block 9 may abut with the grill 25 which in turn abuts with the inner face 12B of panel 12A. The filter frame 26 is aligned to abut with the face 12D of the block 9. To prevent leakage of air at this particular point, a seal 40 such as a rubber seal is inserted between the frame 26 and the face 12D of element 12A. To insure retaining the filter 27 and the frame 26 in a tight pressed relationship with seal 40, the frame 26 is backed up by a plurality of threaded adjustable fixtures 41. Fixtures 41 comprise a right angle bracket 42 one leg of which may be attached to the inner surface of side 12. The other leg is provided with a threaded aperture 43 through which a threaded bolt 44 is mounted, bolt 44 provided with a top 45 that may be turned to adjust the position of bolt 44 so that the end of bolt 44 bears against the frame 26 and thus retains frame 26 in a pressed fitted relationship with seal 40 and the face 12D of block 9. Thus seal 40 abuts with a flat smooth surface on face 12D. It is to be noted that brackets 41 are provided in spaced relation behind both sides as well as the lower edge and upper edge of the frame 26 to retain a pressure mounting around the complete periphery of the filter 27. It is also to be noted that block 9 is pressed and sealed against the inner surface of frame 12 to prevent leakage of contaminated air. With the filter mounted as described in FIG. 2 most of the contaminated air is properly filtered. However due to the drying of the glue that retains the filter media to the frame or due to the glue itself, there may be contamination picked up by the air passing through this area and due to the filter itself being constructed so that it is improperly fitted at the joint between the frame and the filter media, there may be leakage or the gasket or seal 40 may also be faulty and permit leakage. Further if the mounting of brackets 41 are not properly adjusted, there may be insufficient or uneven pressure to hold and press the filter thus permitting leakage or due to improper handling of the complete unit after installation or during delivery, there may be a degree of leakage around the edge of the filter. Thus additional means are provided as illustrated in FIG. 2 to absorb the contamination or leakage that may have been produced. This is in the form of a square tube 50 formed as a complete frame to fit the entire front periphery of the filter mounting, that is, tube 50 will abut with the face 12C of element 12A on one side 50A and will abut with the frame 14A on the opposite side while tube 50 will abut with the lower face of panel 22 and tube 50 will abut with the surface of the platform 11 to thus completely encircle the periphery of filter 27. Tube 50 on its back side 50B will abut with the face of grill 25 thus extending around the entire periphery of filter 27. Tube 50 is securely fastened in this position and tube 50, referring to FIG. 3, is provided with a plurality of apertures 51 on its sides 50C, 50 B and 5OA. Tube 50 extends downward below platform 11 on each side of the filter (FIGS. 1 and 5) and the two ends 52 and 53 are connected to the inlet 54 of the blower 33 thus in operation the blower 33 will produce a suction or vacuum within tube 50 so that with the apertures 51 any leakage of contaminated air past the gasket 40 will be drawn into the small plurality of apertures 51 or any leakage around block 9 and any leakage of contaminated air past the frames 26 and the glued joints of the filter may be drawn through grill 25 but will be sucked in through the apertures 51 on the side 50C for recirculation through the blower to be again filtered before being passed in an uncontaminated form over platform 11.

Referring to FIG. 4 there is illustrated a further embodiment of this invention in which tube 50 is identical to the tube referred to in FIG. 2. However tube 50 is installed in a different position with relation to the sides 12 and 14 and the top panel 22 and platform 11. In this embodiment tube 50 is formed as a slightly larger frame to fit within the recess between the filter frame 26 and the face 12B of the panel 12A. In this particular position the apertures 51 on the back side 50B abut with seal 40 so that any leakage of contaminated air around the periphery of seal 40 will be sucked into the aperture 51 by the vacuum within tube 50 and the apertures 51 in the side 50C of tube 50 are in a closer relationship to the extreme periphery of the filter 27. Thus any leakage of contaminated air past the glued edges of filter 27 will be sucked into the apertures 51 by the vacuum within the tube 50 and thus the contaminated air will be recirculated to be refiltered before again passing through the filter 27 to flow out over the platform 11. Additional ports 51 may be formed in the abutting side 50D to capture any leakage around tube 50.

Although the workbench 10 has been shown of a particular design, the design may vary. In a further embodiment shown in FIG. 6 there are two filters 27, thus the tube 50 is formed into a continuous frame as shown to surround both filters. In a further embodiment shown in FIG. 7, there are a plurality of filters 27 and the tube 50 is formed into a continuous frame as shown to surround each and every filter.

Although the work bench has been shown with a particular arrangement of its components, the plenum chamber 23 may be situated above the work bench and the filter 27 thus positioned in a horizontal position so that the filtered air is blown down upon the workbench without departing from the spirit of this invention and the size of the workbench and filter may vary without departing from the spirit of this invention and the materials utilized to form the rigid structure may vary as long as they provide a sealed plenum chamber that is connected directly to the filter without departing from the spirit of this invention.

What is claimed is:

1. A workbench which comprises two spaced sides supporting a horizontal work platform, a rear wall and a top wall, a front wall extending below said work platform to define a boxlike structure, said work platform having a forward edge and a rear edge, a vertical filter including a peripheral frame, said frame having a peripheral front wall, a peripheral seal in juxtaposition to said peripheral front wall, said vertical filter extending from said rear edge of said work platform to said top wall and abutting both sides, said filter frame mounted in abutment with said seal, said filter spaced from said rear wall to form a plenum chamber within said boxlike structure, an inlet in said boxlike structure below said work platform, a blower mounted in said boxlike structure with an inlet for drawing air from said inlet of said boxlike structure and an outlet connected to said plenum chamber behind said filter to supply air under pressure, an integral duct frame in juxtaposition to said seal about the periphery of the front of said seal, said duct frame having a peripheral inner side wall that is perforated, said duct frame connected to the inlet port of said blower by a conduit to provide a suction within said duct frame when said blower is operated, means to provide a laminar flow of filtered air across said work platform.

2. In a workbench according to claim 1 in which said duct frame is square in form to set into and abut with an angular recess in the periphery of said filter and said filter is glued to said frame.

3. In a workbench according to claim 1 in which in addition to a filtered laminar flow of air provided over a work area, there is a means to redirect any contaminated unfiltered leakage of air flow around and adjacent the periphery of the frame of the filter.

References Cited
UNITED STATES PATENTS

| | | | |
|---|---|---|---|
| 2,752,003 | 6/1956 | Hershey et al. | 55—354 |
| 3,115,818 | 12/1963 | Smith | 98—36 |
| 3,093,401 | 6/1963 | Hagendoorn | 55—493 |
| 3,229,609 | 1/1966 | Larson et al. | |
| 3,229,611 | 1/1966 | Berger. | |
| 3,273,323 | 9/1966 | Whitfield | 55—472 |
| 3,284,148 | 11/1966 | Ramniceanu. | |
| 3,318,076 | 5/1967 | Baker | 55—472 |
| 3,360,910 | 1/1968 | Soltis | 55—502 |
| 3,368,523 | 2/1968 | Becker | 98—115 |

FOREIGN PATENTS

| | | |
|---|---|---|
| 1,022,232 | 3/1966 | Great Britain. |

HARRY B. THORNTON, Primary Examiner

BERNARD NOZICK, Assistant Examiner

U.S. Cl. X.R.

55—484, 502, 504; 98—115